(12) United States Patent
Bruner et al.

(10) Patent No.: US 7,044,346 B2
(45) Date of Patent: May 16, 2006

(54) ROOF RACK FOR RECREATIONAL VEHICLE

(75) Inventors: Scott A. Bruner, Syracuse, IN (US); Brian J. Shea, Mishawaka, IN (US)

(73) Assignee: Gulf Stream Coach, Inc., Nappanee, IN (US)

( * ) Notice: Subject to any disclaimer, the term of this patent is extended or adjusted under 35 U.S.C. 154(b) by 285 days.

(21) Appl. No.: 10/452,365

(22) Filed: Jun. 2, 2003

(65) Prior Publication Data

US 2004/0238580 A1    Dec. 2, 2004

(51) Int. Cl.
*B60R 9/04* (2006.01)

(52) U.S. Cl. .............. 224/324; 224/327; 224/568; 296/37.7

(58) Field of Classification Search ........... 224/309, 224/324, 325, 326, 568, 327, 328, 545; 280/769; 296/37.7
See application file for complete search history.

(56) References Cited

U.S. PATENT DOCUMENTS

| | | | |
|---|---|---|---|
| 1,762,640 A * | 6/1930 | Sanford .............. 296/37.7 |
| 1,804,868 A | 5/1931 | Gage |
| 3,186,569 A | 6/1965 | Roux |
| 3,495,729 A | 2/1970 | Kruse |
| 3,589,576 A | 6/1971 | Rinkle |
| 3,807,787 A * | 4/1974 | Gotz ................... 296/91 |
| 4,065,041 A | 12/1977 | Stegavig et al. |
| 4,081,095 A | 3/1978 | Wilburn et al. |
| 4,081,118 A * | 3/1978 | Mason ................. 224/324 |
| 4,291,823 A | 9/1981 | Freeman et al. |
| 4,350,471 A | 9/1982 | Lehmann |
| 4,483,471 A * | 11/1984 | Prosen ................ 224/314 |
| 4,608,834 A * | 9/1986 | Rummel ............... 62/244 |
| 4,826,387 A | 5/1989 | Audet |
| 5,201,911 A * | 4/1993 | Lee .................... 224/321 |
| 5,346,355 A | 9/1994 | Riemer |
| 5,360,150 A | 11/1994 | Praz |
| 5,531,367 A * | 7/1996 | Ravier ................. 224/329 |
| 5,535,929 A | 7/1996 | Neill |
| 5,544,796 A | 8/1996 | Dubach |
| 5,605,055 A | 2/1997 | Salgado |
| 5,749,436 A * | 5/1998 | Satchwell, III ......... 224/321 |
| 5,791,156 A | 8/1998 | Strautman et al. |
| 5,884,824 A | 3/1999 | Spring, Jr. |
| 6,015,074 A | 1/2000 | Snavely et al. |
| 6,152,339 A * | 11/2000 | Kreisler ............... 224/319 |
| 6,158,638 A | 12/2000 | Szigeti |
| 6,339,934 B1 | 1/2002 | Yoon et al. |
| 6,385,822 B1 | 5/2002 | Dean et al. |
| 6,520,393 B1 | 2/2003 | Ferguson |

FOREIGN PATENT DOCUMENTS

EP         149934 A1 *   7/1985   .............. 224/309

* cited by examiner

*Primary Examiner*—Gary E. Elkins
(74) *Attorney, Agent, or Firm*—Barnes & Thornburg LLP (57) ABSTRACT

An apparatus for carrying cargo on a roof of a recreational vehicle which has a rooftop air conditioning unit is provided and has a space or well that is configured for receipt of the rooftop air conditioning unit therein. The cargo carrier may have cargo-receiving spaces in front of, in back of, and alongside the air conditioning unit. An upper frame member of the cargo carrier may provide a mounting area that is above or even with a top of the air conditioning unit.

20 Claims, 11 Drawing Sheets

ROOF RACK FOR RECREATIONAL VEHICLE

BACKGROUND OF THE INVENTION

The present disclosure relates to cargo carriers, and particularly, to roof racks for recreational vehicles. More particularly, the present disclosure relates to roof racks to which cargo may be attached and having cargo-carrying spaces in which cargo may be placed for transport therein.

Racks and cargo carriers are sometimes attached to the roofs of motor vehicles. Cargo such as canoes, kayaks, bicycles, skis, and other recreational equipment may be attached to such racks and carriers. In addition, luggage and other items may be placed in storage spaces provided in the racks and carriers.

SUMMARY OF THE INVENTION

According to the present disclosure, an apparatus for carrying cargo on a roof of a recreational vehicle which has a rooftop air conditioning unit is provided and has one or more of the following features or combinations thereof. The apparatus comprises a cargo carrier which may have a space or well that is configured for receipt of the rooftop air conditioning unit therein. The cargo carrier may have cargo-receiving spaces in front of, in back of, and alongside the air conditioning unit of the recreational vehicle. The cargo carrier may have an open top. The cargo carrier may completely surround the sides and ends of the air conditioning unit of the recreational vehicle. The cargo carrier may be configured as a rack. The rack may be constructed from a plurality of frame members. Some of the frame members may be U-shaped. An upper frame member of the rack may provide a mounting area that is above or even with a top of the air conditioning unit. The cargo carrier may have a floor structure attachable to the roof of the recreational vehicle, a first set of barriers extending upwardly from the floor structure, and a second set of barriers extending upwardly from the floor structure. The first set of barriers may be arranged to define a unit-receiving well in which the rooftop air conditioning unit is receivable. The second set of barriers may be spaced from the first set of barriers to define a cargo-carrying space being above the floor structure and between the first and second barriers.

Additional features and advantages of the present invention will become apparent to those skilled in the art upon consideration of the following detailed description exemplifying the best mode of carrying out the invention as presently perceived.

BRIEF DESCRIPTION OF THE DRAWINGS

The detailed description particularly refers to the accompanying drawings in which.

DETAILED DESCRIPTION OF THE DRAWINGS

Figure 1:
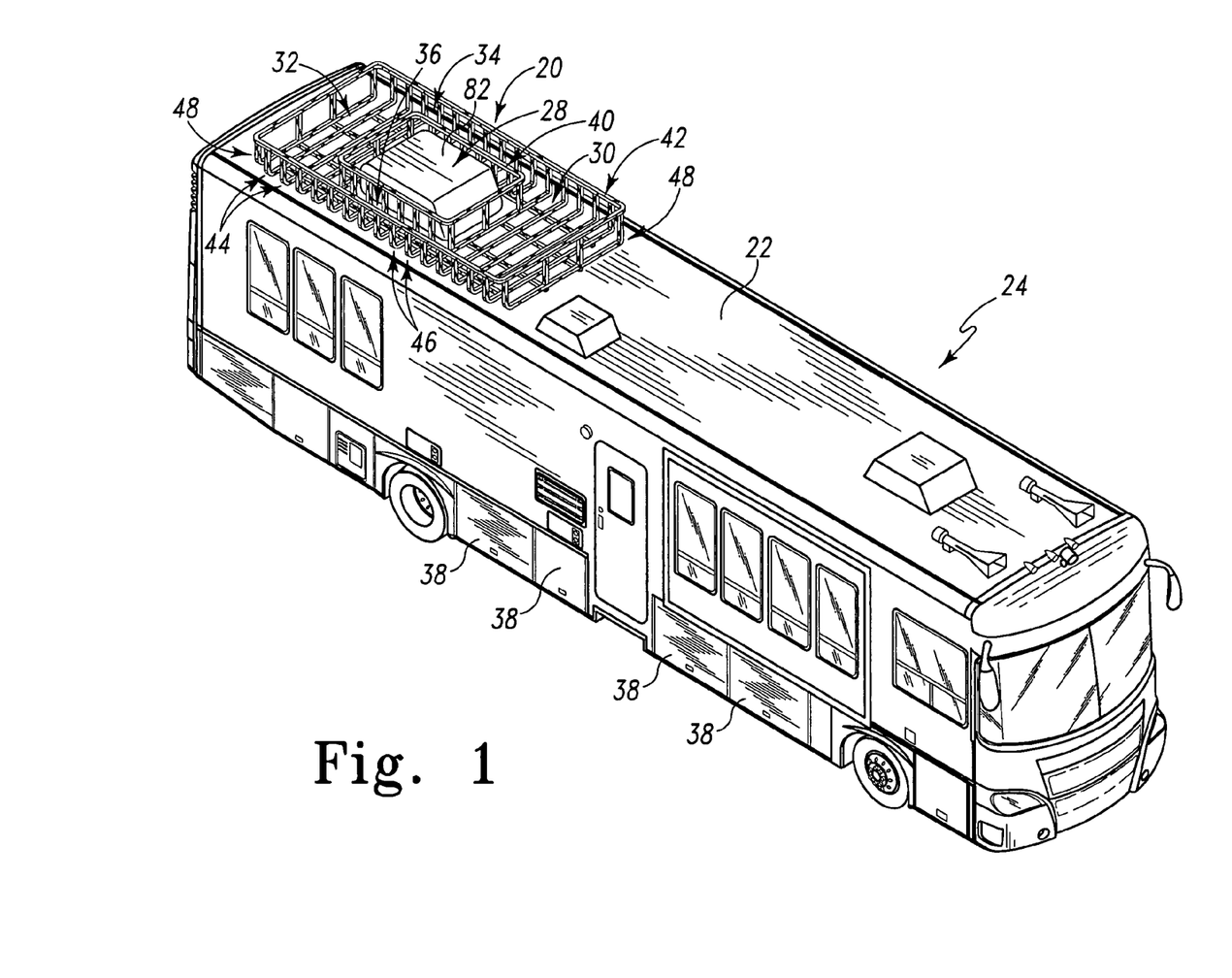
FIG. 1 is a perspective view showing a cargo carrier in accordance with the present disclosure mounted to a roof of a recreational vehicle, the recreational vehicle having a rooftop air conditioning unit, and the cargo carrier having a unit-receiving space or well that receives the rooftop air conditioning unit therein.

A cargo carrier 20 in accordance with this disclosure mounts to a roof 22 of a recreational vehicle 24 as shown in FIG. 1. Carrier 20 has a unit-receiving space or well 26, shown in FIG. 2 that is configured to receive a rooftop air conditioning unit 28, shown in FIG. 1, of vehicle 24. In addition, carrier 20 is configured to define a first cargo-receiving space 30 in front of unit 28, a second cargo-receiving space 32 behind unit 28, a third cargo-receiving space 34 along one side of unit 28, and a fourth cargo-receiving space 36 along the other side of unit 28. Thus, carrier 20 and the associated spaces 30, 32, 34, 36 provided in carrier 20 surround rooftop air conditioning unit 28.

Figure 2:
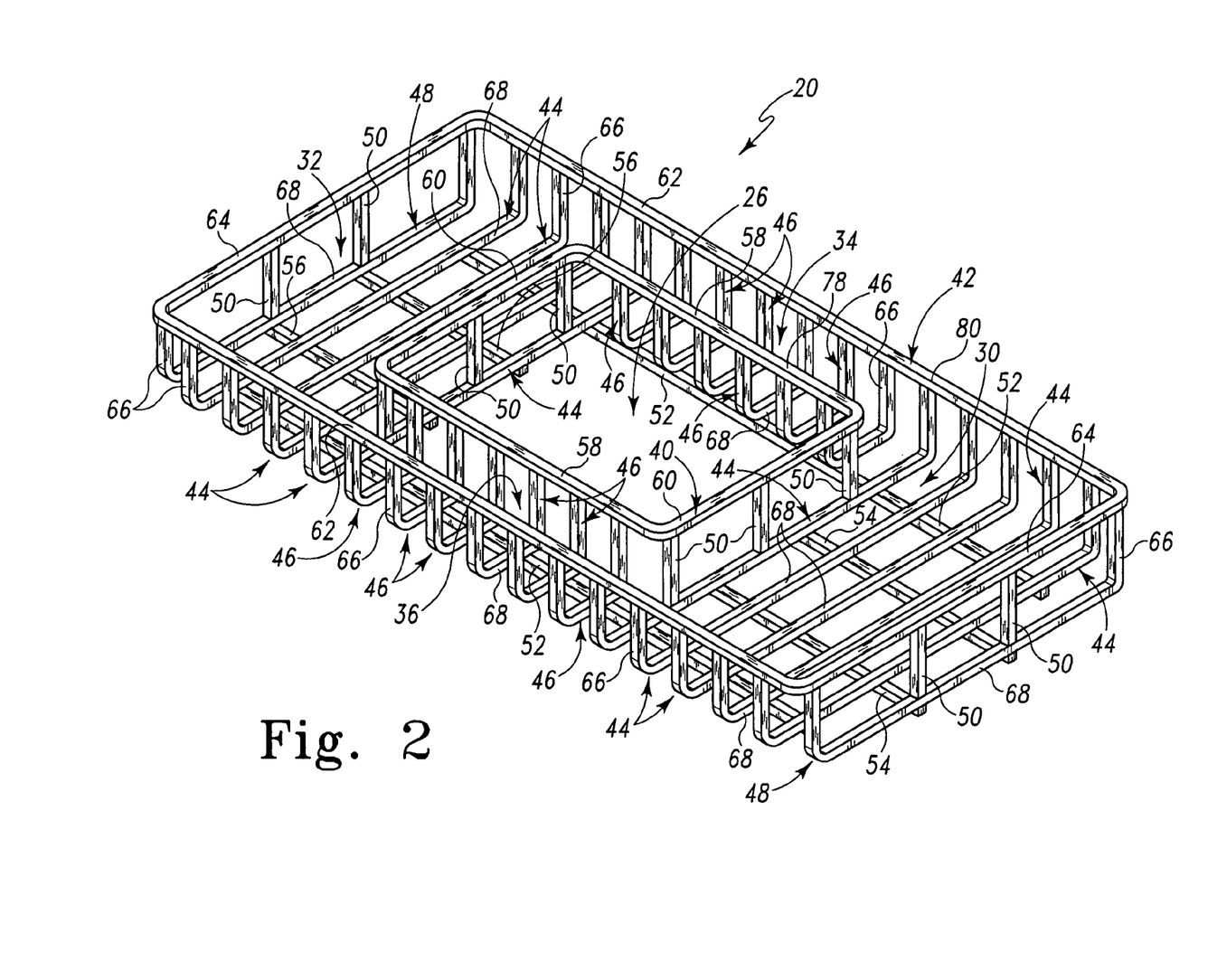
FIG. 2 is a perspective view of the cargo carrier of FIG. 1 showing the cargo carrier comprising a rack that is constructed from a plurality of frame members forming cargo-receiving spaces in front of, in back of, and alongside the unit-receiving well.

Carrier 20 is configured so that spaces 34, 36 open at one end into space 30 and open at the opposite end into space 32. Thus, an object carried by carrier 20 may have portions occupying one or more of spaces 30, 32, 34, 36 depending upon the size and orientation of the object. Examples of objects that may be carried in one or more of spaces 30, 32, 34, 36 include luggage, skis, bicycles, and camping equipment, such as tents, folding chairs, folding tables, and the like. This list of exemplary objects is by no means exhaustive, and therefore, it will be appreciated that all sorts of objects of just about every imaginable type may be carried by carrier 20. Thus, carrier 20 provides spaces for carrying objects in addition to the spaces provided in the main living area (not shown) of the recreational vehicle 24 and in addition to spaces provided beneath the main living area behind one or more doors 38 of vehicle 24.

Figure 4:
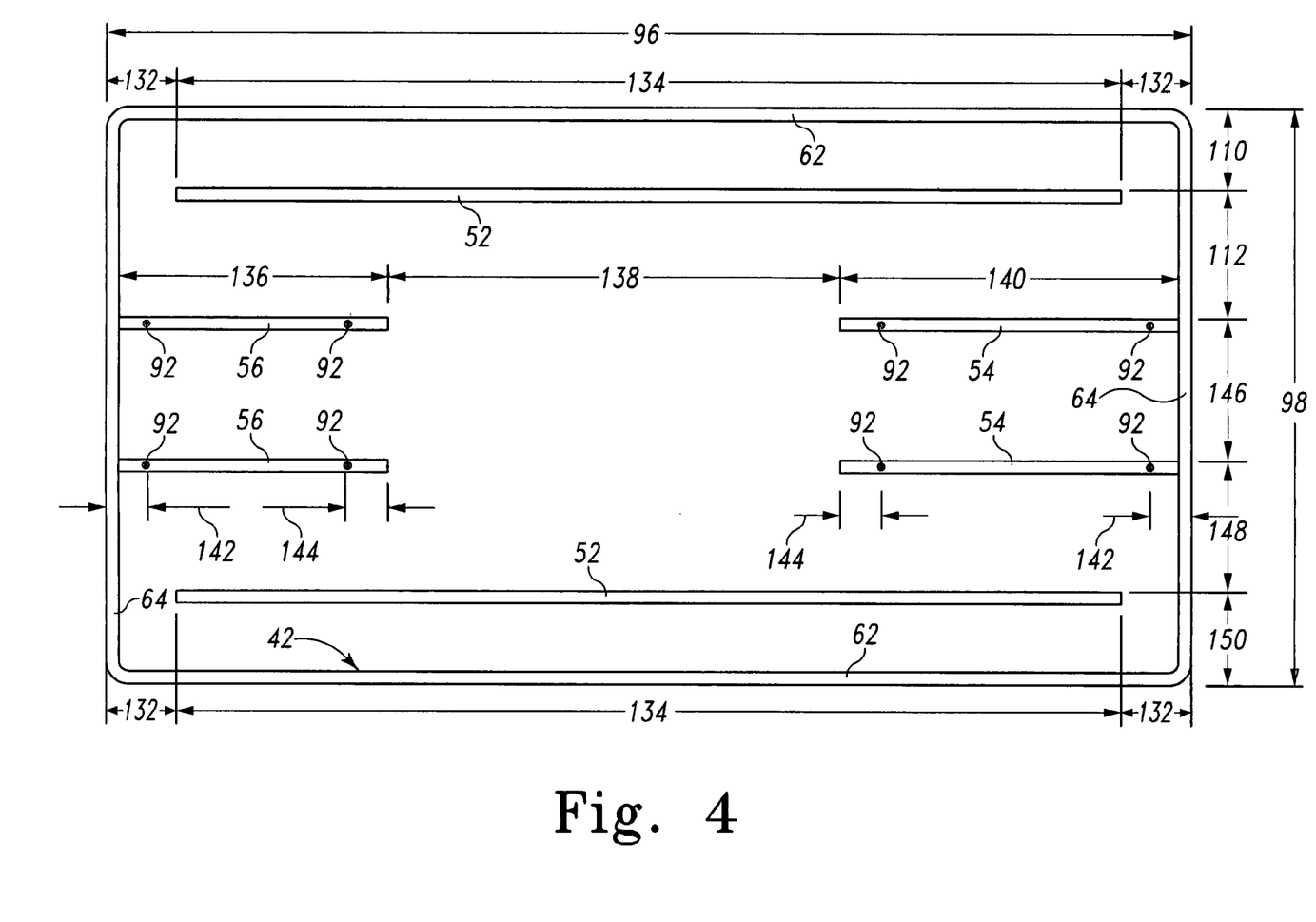
FIG. 4 is a top view, similar to FIG. 3, but with the inner rectangular frame and the transversely-extending frame members removed so that the longitudinally-extending frame members can be seen without obstruction from the removed frame members.
Figure 5:
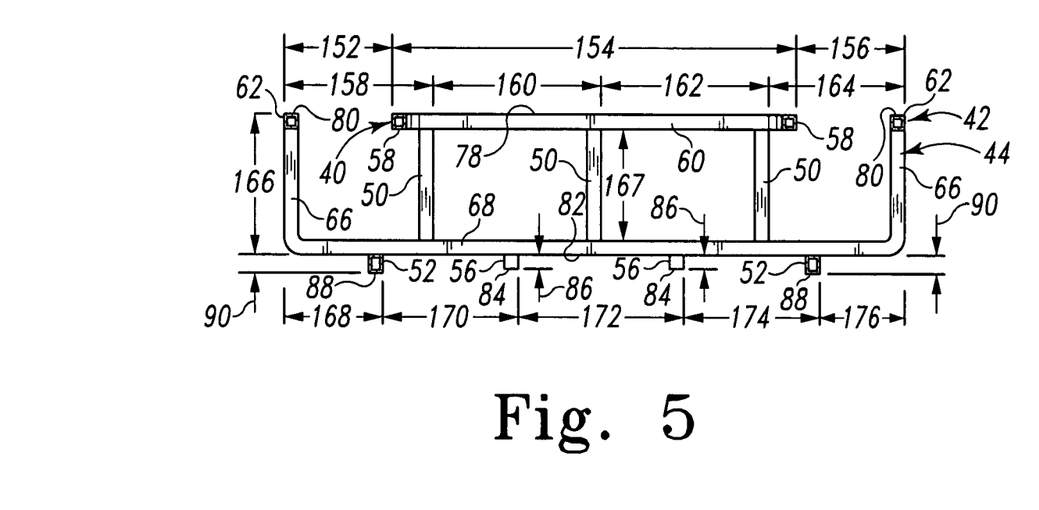
FIG. 5 is a sectional view, taken along line 5—5 of FIG. 3, showing a top surface of the inner rectangular frame member being substantially coplanar with a top surface of the outer rectangular frame member.
Figure 6:
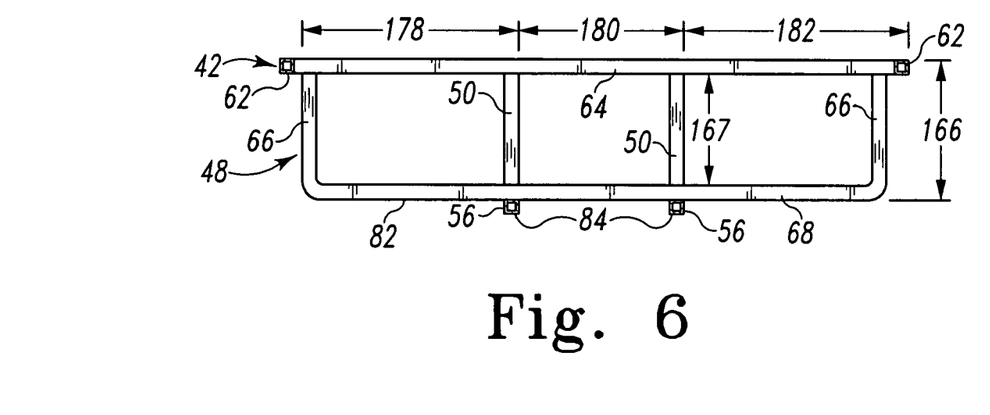
FIG. 6 is a sectional view, taken along line 6—6 of FIG. 3, showing a transversely-extending frame member at an end of the roof rack being U-shaped and having vertical portions coupled to an underside of the outer rectangular frame and showing a pair of vertical frame members extending between a horizontal portion of the transversely-extending frame member and the under side of the outer rectangular frame.

Illustrative carrier 20 is configured as a rack and is constructed from a number of frame members including a first rectangular frame 40, a second rectangular frame 42, a set of long U-shaped frame members 44, a set of short U-shaped frame members 46, and a pair of medium sized U-shaped frame members 48. Carrier 20 has a set of vertical frame members 50 as shown in FIGS. 2, 5, and 6. In addition, carrier 20 has a first pair of longitudinally extending frame members 52, a second pair of longitudinally extending frame members 54, and a third pair of longitudinally extending frame members 56 as shown best in FIG. 4.

Figure 3:
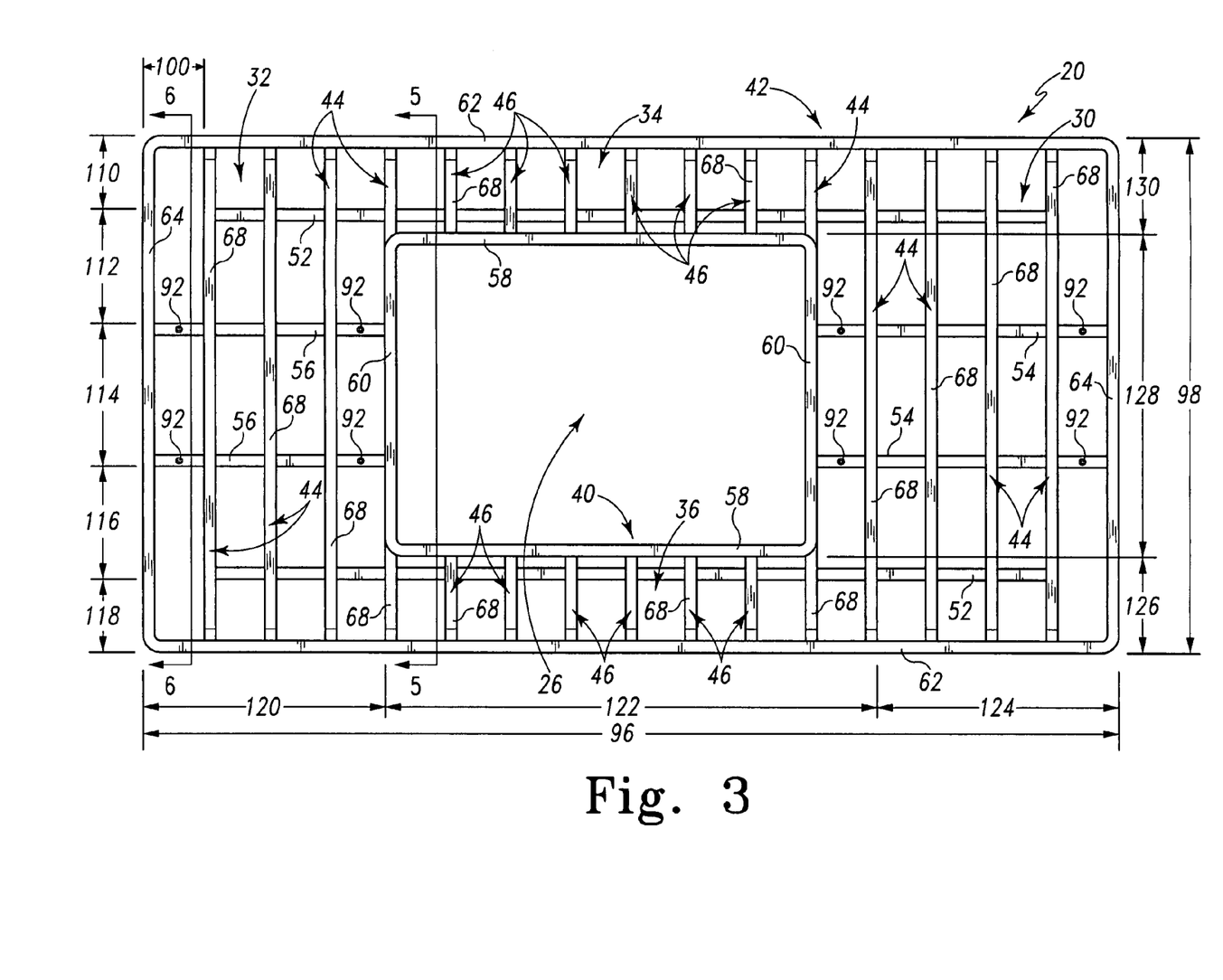
FIG. 3 is a top view of the cargo carrier of FIG. 2 showing the cargo carrier having a somewhat rectangular shape with an outer rectangular frame member, an inner rectangular frame member, a set of transversely-extending frame members having portions that are parallel with the short dimensions of the rectangular frames, and a set of longitudinally-extending frame members that are parallel with the long dimensions of the rectangular frames.
Figure 7:
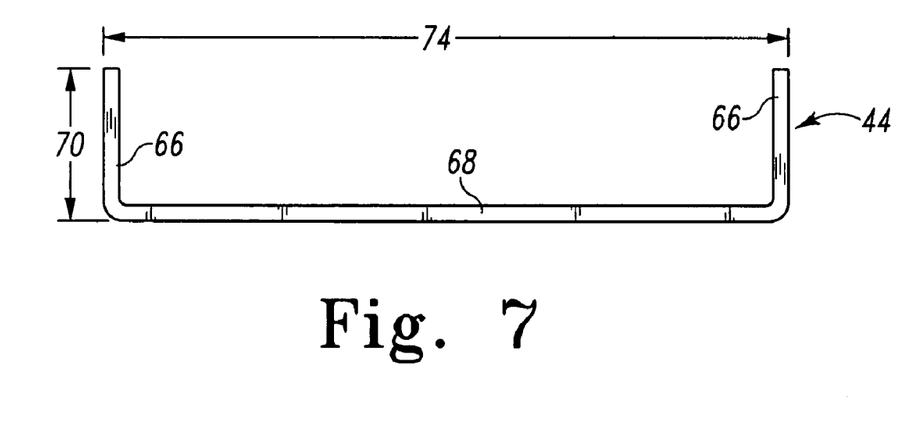
FIG. 7 is a front elevation view of a long U-shaped frame member used to construct the roof rack of FIG. 1.
Figure 8:
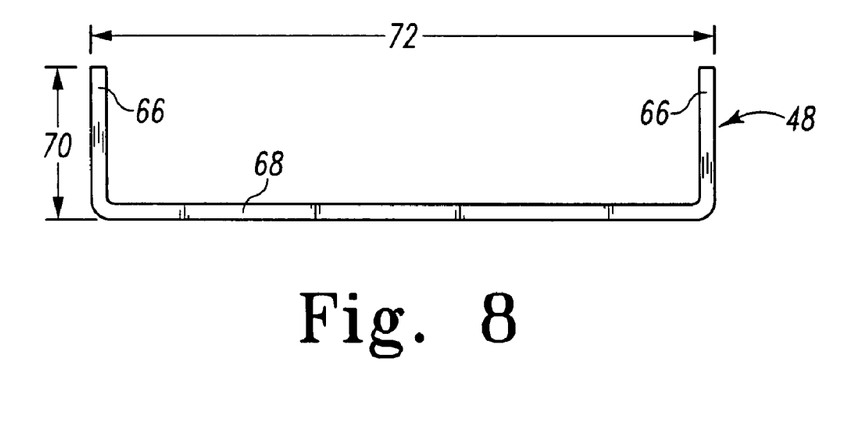
FIG. 8 is a front elevation view of a medium U-shaped frame member used to construct the roof rack of FIG. 1.
Figure 9:
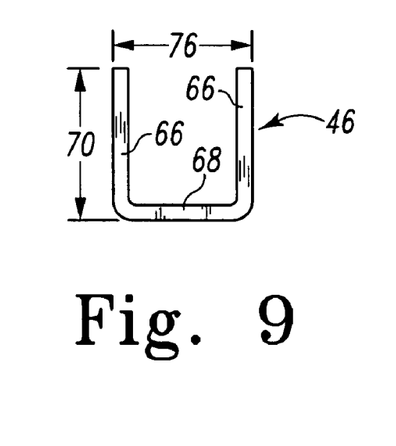
FIG. 9 is a front elevation view of a short U-shaped frame member used to construct the roof rack of FIG. 1.

Frame 40 has a pair of longitudinally extending portions 58 and a pair of laterally extending portions 60 as shown in FIGS. 2 and 3. Portions 58, 60 are joined at rounded corner regions to form the rectangular shape of frame 40. Similarly, frame 42 has a pair of longitudinally extending portions 62 and a pair of laterally extending portions 64. Portions 62, 64 are joined at rounded corner regions to form the rectangular shape of frame 42. Each of U-shaped frame members 44, 46, 48 has a pair of vertical portions or uprights 66 and a horizontal portion or bight 68 extending between uprights 66 as shown in FIGS. 7–9. Portions 66, 68 of each U-shaped frame member are joined to together at respective rounded corner regions of each U-shaped frame member 44, 46, 48. Portions 68 of frame members 44, 46, 48 are each oriented along the lateral dimension of carrier 20.

Vertical portions 66 of frame members 44, 46, 48 each have substantially an equivalent height 70 as shown in FIGS. 7–9. However, a length 72 of portion 68 of frame member 48, shown in FIG. 8, is shorter than a length 74 of frame member 44, shown in FIG. 7, and is longer than a length 76 of frame member 46, shown in FIG. 9. An upper end of one of portions 66 of each frame member 46 is coupled, such as by welding or brazing, to an undersurface of portion 58 of frame 40 and an upper end of the other of portions 66 of each frame member 46 is coupled to an undersurface of portion 62 of frame 42 as shown in FIG. 2. In addition, upper ends of portions 66 of each frame member 44 are coupled to respective portions 62 of frame 42.

Frame members 48 are situated at the ends of carrier 20 and the upper ends of portions 66 of each frame member 48 are coupled to respective portions 64 of frame 42. Pairs of vertical frame members 50 span between respective portions 68 of frame members 48 and associated portions 64 of frame 42 lying thereabove at the ends of carrier 20. In addition, three vertical frame members 50 span between respective portions 68 of two of frame members 44 and the associated portions 60 of frame 40 lying thereabove.

In the illustrative embodiment, frames 40, 42 are supported atop portions 66 of frame members 44, 46, 48 and atop frame members 50 such that a top surface 78 of frame 40 is substantially coplanar with a top surface 80 of frame 42 as shown best in FIG. 5. Carrier 20 is configured so that a plane defined by top surfaces 78, 80 of frames 40, 42 is situated above a top surface 82 of rooftop air conditioning unit 28. By configuring carrier 20 in this manner, any straight or flat object resting upon one or both of frames 40, 42 and extending across well 26 will remain out of contact with unit 28. Examples of objects that may rest upon one or both of frames 40, 42 include canoes, kayaks, small row boats, lumber, and the like. Thus, carrier 20 shields and protects unit 28 from cargo carried on frames 40, 42 of carrier 20.

Frame members 52, 54, 56 and portions 68 of frame members 44, 46, 48 are considered to be a floor structure of carrier 20. Each of portions 68 extends parallel with the lateral dimension of carrier 20 and each of frame members 52, 54, 56 extends parallel with the longitudinal dimension of carrier 20. In addition, each of frame members 52, 54, 56 is coupled, such as by welding or brazing, to an undersurface 82 of associated portions 68 of frame members 44, 46, 48 as shown, for example, in FIGS. 5 and 6. Frame members 54 are spaced from, but aligned with, frame members 56 as shown in FIG. 4. Frame members 54 are adjacent to the front of carrier 20, whereas frame members 56 are adjacent to the back of carrier 20.

Frame members 52 are positioned laterally outboard of frame members 54, 56. Each of frame members 54, 56 has a bottom surface 84 that is spaced vertically below undersurfaces 82 of frame members 44, 46, 48 by a first distance 86 and each of frame members 52 has a bottom surface 88 that is spaced vertically below undersurfaces 82 of frame members 44, 46, 48 by a second distance 90 which is larger than first distance 86 as shown in FIG. 5. The difference in size of frame members 52 compared to frame members 54, 56 matches or accommodates a contour of roof 22 of vehicle 24. Roof 22 may have, for example, a crowned or stepped contour. Frame members 52, 54, 56 are sized such that bottom surfaces 84, 88 rest upon roof 22 so as to support portions 68 of frame members 44, 46, 48 in a horizontal orientation. In the illustrative embodiment, frame members 54, 56 each have a pair of vertical apertures therethrough for receipt of respective fasteners, such as bolts 92 shown in FIG. 4, that are used to attach carrier 20 to roof 22 of vehicle 24.

Frame 40, the frame members 50 that are situated beneath portions 60 of frame 40, and the portions 66 of U-shaped frame members 46 that are situated beneath portions 58 of frame 40 are considered to be a first set of barriers that extend upwardly from the floor structure of carrier 20. Unit-receiving space 26 is defined in a central region of carrier 20 between the first set of barriers. The first set of barriers surround space 26 to form a large opening through carrier 20 that is sized for receipt of rooftop air conditioning unit 28 therein. The first set of barriers separate space 26 from each of spaces 30, 32, 34, 36. The first set of barriers are in fairly close proximity to unit 28 and tend to prevent objects carried in one or more of spaces 30, 32, 34, 36 from moving into contact with unit 28.

Frame 42, the frame members 50 that are situated beneath portions 64 of frame 42, the portions 66 of U-shaped frame members 48 that are situated beneath portions 64 of frame 42, and the portions 66 of frame members 44, 46 that are situated beneath portions 62 of frame 42 are considered to be a second set of barriers that extend upwardly from the floor structure of carrier 20. Spaces 30, 32, 34, 36 are defined above the floor structure and between the first and second set of barriers. The second set of barriers surround spaces 30, 32, 34, 36 and are spaced from the first set of barriers. The second set of barriers tends to prevent objects carried in spaces 30, 32, 34, 36 from falling out of carrier 20. Frames 40, 42 and frame members 44, 46, 48, 50 provide numerous attachment points for ropes, straps, flexible cords (such as BUNGEE® cords), and the like which may be used to further retain or secure cargo in or on carrier 20.

In the illustrative embodiment, frames 40, 42 and frame members 44, 46, 48, 50, 54, 56 are made from 1 inch by 1 inch aluminum tubes having square-shaped cross sections. In addition, frame members 52 are made from 1 inch by 1¼ inch aluminum tubes having rectangular-shaped cross sections. Thus, all of the frame members of illustrative carrier 20 have quadrilateral-shaped cross sections. In the illustrative embodiment of carrier 20, height 70 of frame members 44, 46, 48 is ten inches; length 72 of frame member 48 is forty six inches, length 74 of frame member 44 is fifty inches, and length 76 of frame member 46 is ten inches. All dimensions listed herein as pertaining to the illustrative carrier 20 and to alternative embodiments, are approximate and, it will be appreciated that reasonable manufacturing tolerance ranges, such as up to plus or minus 10% of the recited dimension, for example, may occur during manufacture. Furthermore, all of the dimensions listed herein are intended to be non-limiting and therefore, carriers having dimensions different than the listed dimensions are contemplated by this disclosure.

Referring to FIG. 3, the illustrative carrier 20 has an overall length 96 of ninety seven inches and an overall width 98 of fifty inches. Other dimensions shown in FIG. 3 are as follows: dimension 100 is six inches; dimension 110 is seven inches; dimension 112 is eleven inches; dimension 114 is fourteen inches; dimension 116 is eleven inches; dimension 118 is seven inches; dimension 120 is twenty four inches; dimension 122 is forty three inches; dimension 124 is thirty inches; dimension 126 is nine inches; dimension 128 is thirty two inches; and dimension 130 is nine inches. Dimension 100 of six inches is typical of the spacing between each adjacent pair of frame members 44, 46, 48 along the longitudinal dimension of carrier 20. Thus, frame members 44, 46, 48 are equidistantly spaced between the ends of carrier 20.

Referring to FIG. 4, dimensions 96, 98, 110, 112 of illustrative carrier 20 are shown again. Other dimensions shown in FIG. 4 are as follows: dimension 132 is six inches; dimension 134 is eighty five inches; dimension 136 is twenty five inches; dimension 138 is forty one inches; dimension 140 is thirty one inches; dimension 142 is three and one half inches; dimension 144 is three and one half inches; dimension 146 is thirteen inches; dimension 148 is eleven inches; and dimension 150 is eight inches. Referring to FIG. 5, additional dimensions of illustrative carrier 20 are as follows: dimension 86 is one inch; dimension 90 is one and one fourth inches; dimension 152 is nine inches; dimension 154 is thirty two inches; dimension 156 is nine inches; dimension 158 is twelve inches; dimension 160 is thirteen and one half inches; dimension 162 is thirteen and one half inches; dimension 164 is eleven inches; dimension 166 is eleven inches; dimension 167 is nine inches; dimension 168 is eight inches; dimension 170 is eleven inches; dimension 172 is thirteen inches; dimension 174 is eleven inches; and dimension 176 is seven inches. Referring to FIG. 6, in addition to dimensions 166, 167, the following dimensions of illustrative carrier 20 are shown: dimension 178 is nineteen inches; dimension 180 is thirteen inches; and dimension 182 is eighteen inches.

Figure 10:
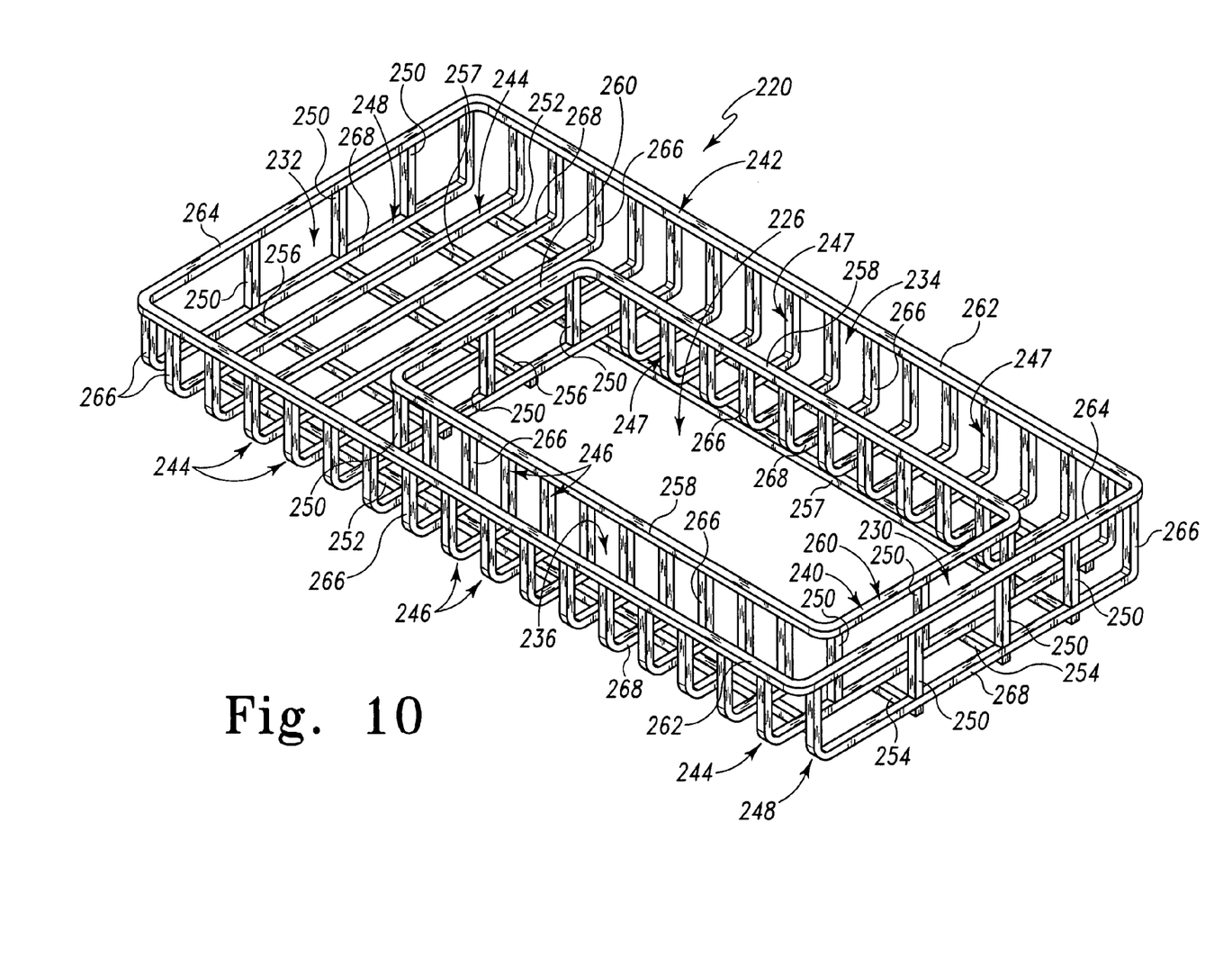
FIG. 10 is perspective view, similar to FIG. 2, of an alternative roof rack according to this disclosure having a unit-receiving space or well configured for receipt of an air-conditioning unit of a recreational vehicle, having a first cargo-receiving space in back of the unit-receiving space being larger than a second cargo-receiving space in front of the unit-receiving space, and having a third cargo-receiving space along one side of the unit-receiving space being larger than a fourth cargo-receiving space along the other side of the unit-receiving space.

An alternative embodiment carrier 220, which is similar to carrier 20, is shown, for example, in FIG. 10. Cargo carrier 220 is mountable to a roof of a recreational vehicle (not shown). Carrier 220 has a unit-receiving space or well 226 that is configured to receive a rooftop air conditioning unit of the associated vehicle. In addition, carrier 220 is configured to define a first cargo-receiving space 230 in front of well 226, a second cargo-receiving space 232 behind well 226, a third cargo-receiving space 234 along one side of well 226, and a fourth cargo-receiving space 236 along the other side of well 226. Carrier 220 is configured so that spaces 234, 236 open at one end into space 230 and open at the opposite end into space 232.

Compared to carrier 20, which has well 26 centered between the sides thereof so that space 34 is substantially the same size as space 36, well 226 is shifted closer to one side of carrier 220 than the other so that space 234 is noticeably larger than space 236. In addition, compared to carrier 20, which has well 26 shifted only slightly toward the back of carrier 20 so that the space 30 in front of well 26 is slightly larger than the space 32 in back of well 26, well 226 is longer than well 26 and is shifted noticeably toward the front of carrier 220 so that the space 230 in front of well 226 is much smaller than the space 232 in back of well 26. Thus, carrier 220 is designed to accommodate a rooftop air conditioning unit (not shown) that has a different size than unit 28, shown in FIG. 1, and that is positioned differently on a roof of a recreational vehicle than unit 28 is positioned on roof 22 of vehicle 24.

Figure 12:
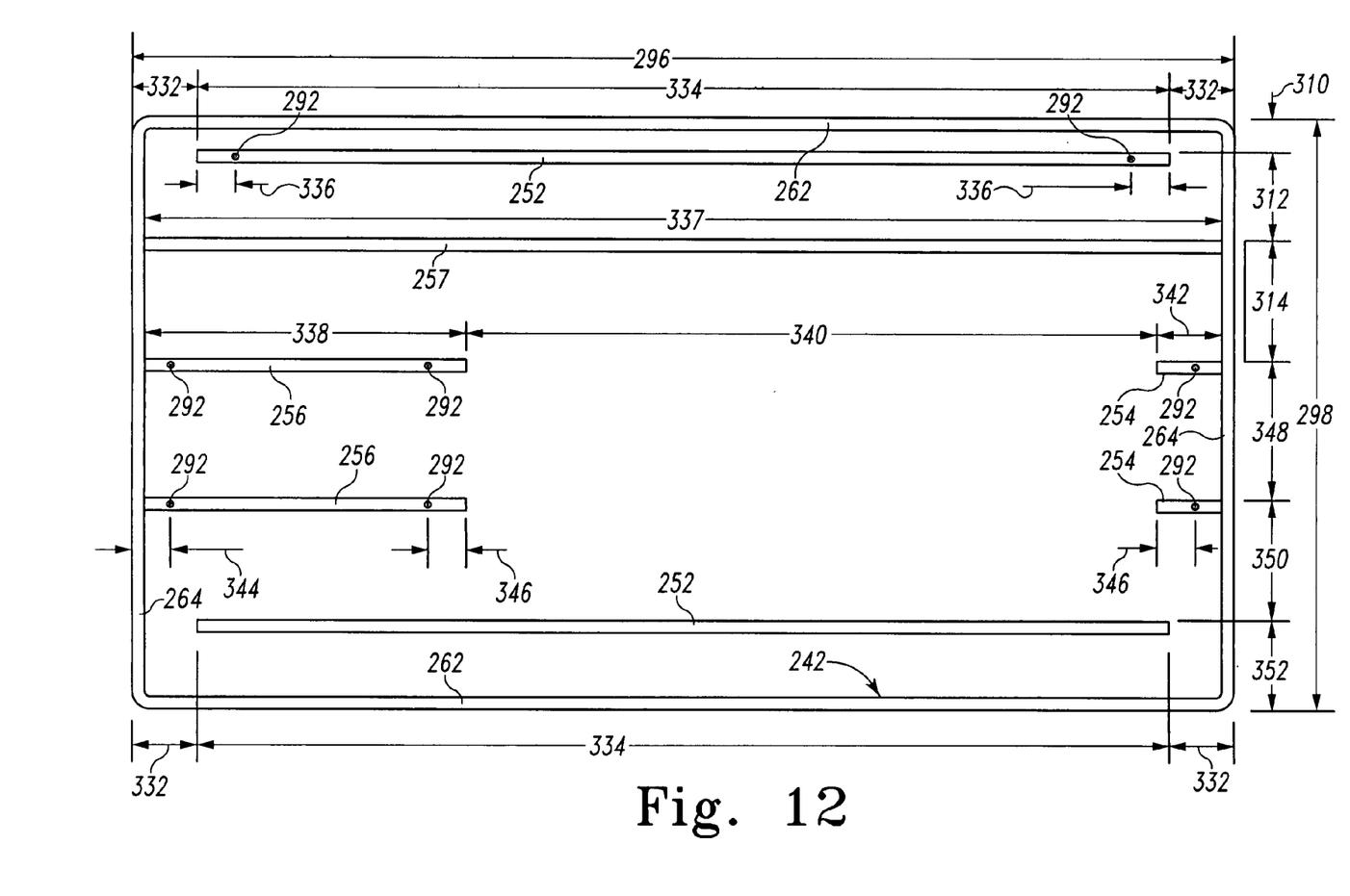
FIG. 12 is a top view, similar to FIG. 11, but with the inner rectangular frame and the transversely-extending frame members removed so that the longitudinally-extending frame members can be seen without obstruction from the removed frame members.
Figure 13:
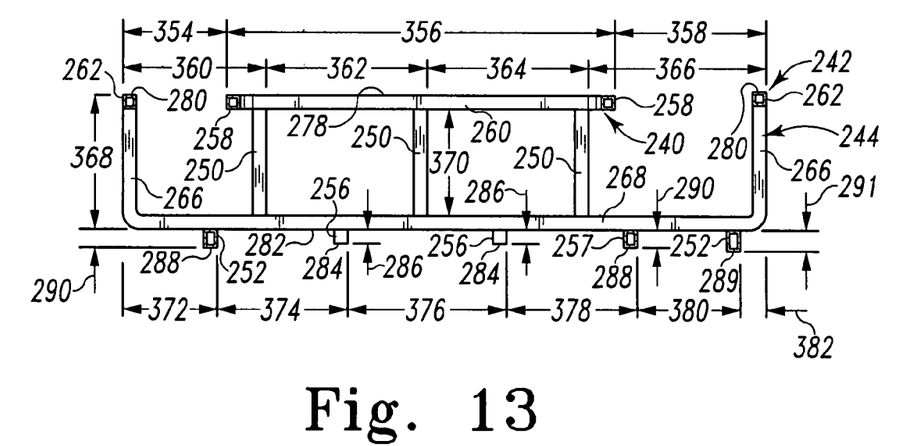
FIG. 13 is a sectional view, taken along line 13—13 of FIG. 11, showing a top surface of the inner rectangular frame member being substantially coplanar with a top surface of the outer rectangular frame member.
Figure 14:
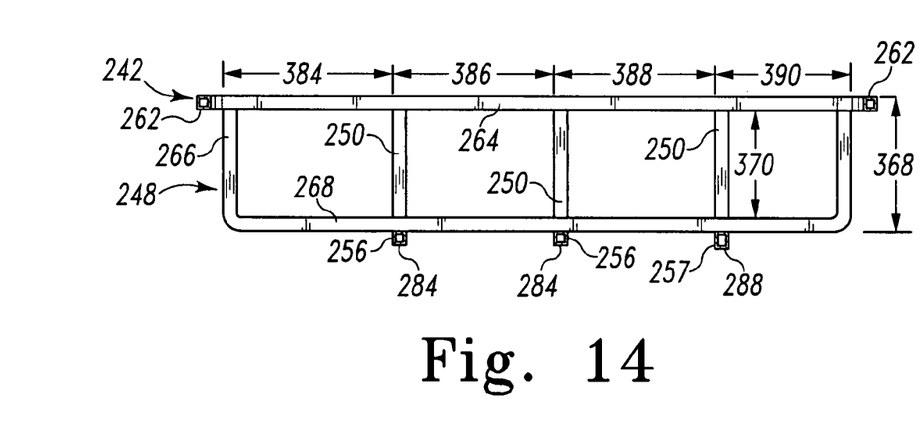
FIG. 14 is a sectional view, taken along line 14—14 of FIG. 11, showing a transversely-extending frame member at an end of the roof rack being U-shaped and having vertical portions coupled to an underside of the outer rectangular frame and showing a pair of vertical frame members extending between a horizontal portion of the transversely-extending frame member and the under side of the outer rectangular frame.
Figure 15:
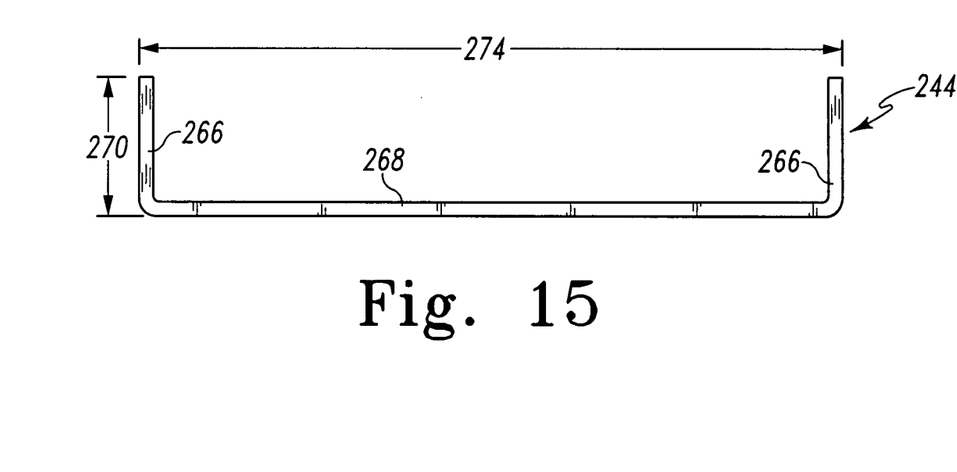
FIG. 15 is a front elevation view of a first U-shaped frame member used to construct the roof rack of FIG. 10.

Illustrative carrier 220 is configured as a rack and is constructed from a number of frame members including a first rectangular frame 240, a second rectangular frame 242, a set of first U-shaped frame members 244, a set of second U-shaped frame members 246, a set of third U-shaped frame members 247, and a pair of fourth U-shaped frame members 248. Carrier 220 has a set of vertical frame members 250 as shown in FIGS. 10, 13, and 14. In addition, carrier 220 has a first pair of longitudinally extending frame members 252, a second pair of longitudinally extending frame members 254, a third pair of longitudinally extending frame members 256, and a longitudinally extending frame member 257 as shown best in FIG. 12.

Figure 11:
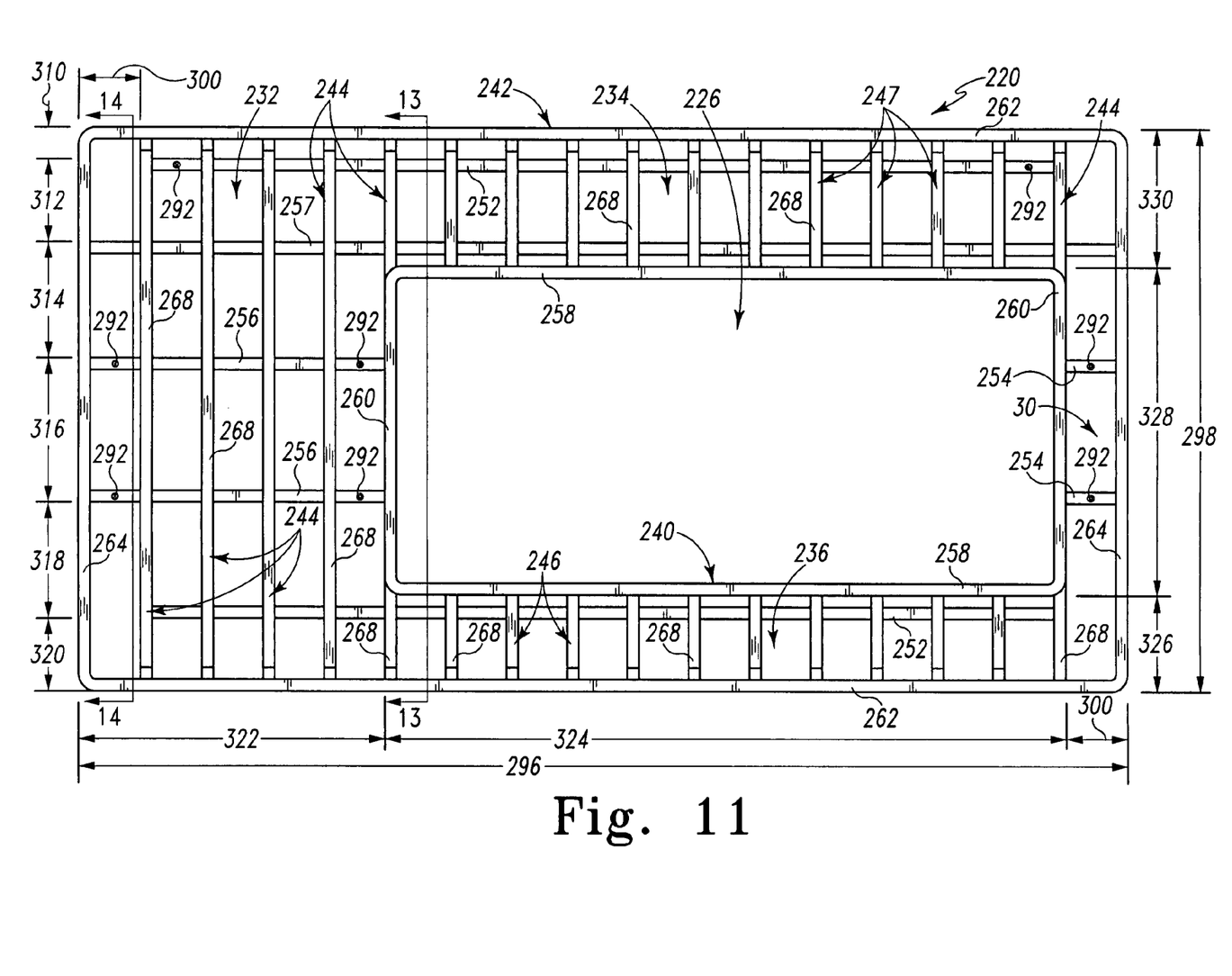
FIG. 11 is a top view of the cargo carrier of FIG. 10 showing the cargo carrier having a somewhat rectangular shape with an outer rectangular frame member, an inner rectangular frame member, a set of transversely-extending frame members having portions that are parallel with the short dimensions of the rectangular frames, and a set of longitudinally-extending frame members that are parallel with the long dimensions of the rectangular frames.

Frame 240 has a pair of longitudinally extending portions 258 and a pair of laterally extending portions 260 as shown in FIGS. 10 and 11. Portions 258, 260 are joined at rounded corner regions to form the rectangular shape of frame 240. Similarly, frame 242 has a pair of longitudinally extending portions 262 and a pair of laterally extending portions 264. Portions 262, 264 are joined at rounded corner regions to form the rectangular shape of frame 242. Each of U-shaped frame members 244, 246, 247, 248 has a pair of vertical portions or uprights 266 and a horizontal portion or bight 268 extending between uprights 266 as shown in FIGS. 15–18. Portions 266, 268 of each U-shaped frame member are joined to together at respective rounded corner regions of each U-shaped frame member 244, 246, 247, 248. Portions 268 of frame members 244, 246, 247, 248 are each oriented along the lateral dimension of carrier 220.

Figure 16:
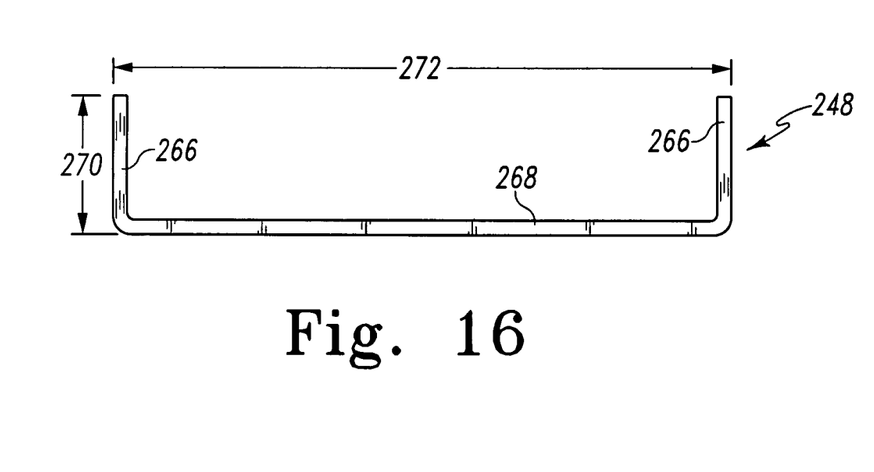
FIG. 16 is a front elevation view of a second U-shaped frame member used to construct the roof rack of FIG. 10.
Figure 17:
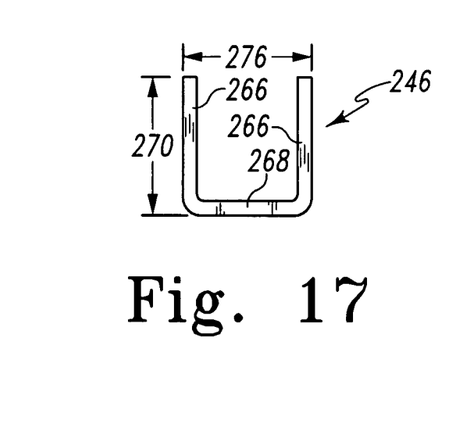
FIG. 17 is a front elevation view of a third U-shaped frame member used to construct the roof rack of FIG. 10.
Figure 18:
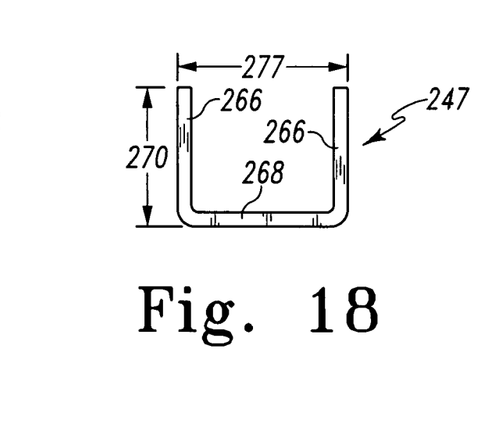
FIG. 18 is a front elevation view of a fourth U-shaped frame member used to construct the roof rack of FIG. 10.

Vertical portions 266 of frame members 244, 246, 247, 248 each have substantially an equivalent height 270 as shown in FIGS. 15–18. However, a length 272 of portion 268 of frame member 248, shown in FIG. 16, is shorter than a length 274 of frame member 244, shown in FIG. 15, and is longer than a length 276 of frame member 246, shown in FIG. 17. In addition, a length 277 of frame member 247, shown in FIG. 18, is longer than length 276, but is shorter than length 272.

An upper end of one of portions 266 of each frame member 246 is coupled, such as by welding or brazing, to an undersurface of one of portions 258 of frame 240 and an upper end of the other of portions 266 of each frame member 246 is coupled to an undersurface of one of portions 262 of frame 242 as shown in FIG. 10. Similarly, an upper end of one of portions 266 of each frame member 247 is coupled to an undersurface of the other of portions 258 of frame 240 and an upper end of the other of portions 266 of each frame member 247 is coupled to an undersurface of the other of portions 262 of frame 242 as shown in FIG. 10. Thus, frame members 246 are situated on one side of carrier 220 and frame members 247 are situated on the other side of carrier 220. In addition, upper ends of portions 266 of each frame member 244 are coupled to respective portions 262 of frame 242.

Frame members 248 are situated at the ends of carrier 220 and the upper ends of portions 266 of each frame member 248 are coupled to respective portions 264 of frame 242. Three vertical frame members 250 span between respective portions 268 of frame members 248 and associated portions 264 of frame 242 lying thereabove at each end of carrier 220. In addition, three vertical frame members 250 span between respective portions 268 of two of frame members 244 and the associated portions 260 of frame 240 lying thereabove.

In the illustrative embodiment, frames 240, 242 are supported atop portions 266 of frame members 244, 246, 247, 248 and atop frame members 250 such that a top surface 278 of frame 240 is substantially coplanar with a top surface 280 of frame 242 as shown best in FIG. 13. Carrier 220 is configured so that a plane defined by top surfaces 278, 280 of frames 240, 242 is situated above a top surface of the rooftop air conditioning unit situated in well 226. Thus, carrier 220 shields and protects unit 28 from cargo carried on frames 240, 242 of carrier 220.

Frame members 252, 254, 256, 257 and portions 268 of frame members 244, 246, 247, 248 are considered to be a floor structure of carrier 220. Each of portions 268 extends parallel with the lateral dimension of carrier 220 and each of frame members 252, 254, 256, 257 extends parallel with the longitudinal dimension of carrier 220. In addition, each of frame members 252, 254, 256, 257 is coupled, such as by welding or brazing, to an undersurface 282 of associated portions 268 of frame members 244, 246, 247, 248 as shown, for example, in FIGS. 13 and 14. Frame members 254 are spaced from, but aligned with, frame members 256 as shown in FIG. 12. Frame members 254 are adjacent to the front of carrier 220, whereas frame members 256 are adjacent to the back of carrier 220.

Frame members 252 are positioned laterally outboard of frame members 254, 256. Frame member 257 is positioned between one of frame members 252 and the pairs of frame members 254, 256. Each of frame members 254, 256 has a bottom surface 284 that is spaced vertically below undersurfaces 282 of frame members 244, 246, 247, 248 by a first distance 286. One frame members 252 and frame member 257 each have a bottom surface 288 that is spaced vertically below undersurfaces 282 of frame members 244, 246, 247, 248 by a second distance 290 which is larger than first distance 286 as shown in FIG. 13. The other of frame members 252 has a bottom surface 289 that is spaced vertically below undersurfaces 282 of frame members 244, 246, 247, 248 by a third distance 291 which is larger than second distance 290. The difference in size of the various frame members 252, 254, 256, 257 matches or accommodates a contour of the roof of the vehicle to which carrier 220 is to be mounted.

Frame members 252, 254, 256, 257 are sized such that bottom surfaces 284, 288, 289 rest upon the associated roof so as to support portions 268 of frame members 244, 246, 247, 248 in a horizontal orientation. In the illustrative embodiment, the frame member 252 which is adjacent frame member 257 has a pair of vertical apertures therethrough, each of frame members 256 has a pair of vertical apertures therethrough, and each of frame members 254 has a vertical aperture therethrough. The apertures formed in frame members 252, 254, 256 receive fasteners, such as bolts 292 shown in FIG. 12, that are used to attach carrier 220 to the roof of the associated vehicle.

Frame 240, the frame members 250 that are situated beneath portions 260 of frame 240, and the portions 266 of U-shaped frame members 246, 247 that are situated beneath portions 258 of frame 240 are considered to be a first set of barriers that extend upwardly from the floor structure of carrier 220. Unit-receiving space 226 is defined in a central region of carrier 220 between the first set of barriers. The first set of barriers surround space 226 to form a large opening through carrier 220 that is sized for receipt of the associated rooftop air conditioning unit therein. The first set of barriers separate space 226 from each of spaces 230, 232, 234, 236. The first set of barriers are adapted to be in fairly close proximity to the air conditioning unit received therein and tend to prevent objects carried in one or more of spaces 230, 232, 234, 236 from moving into contact with the unit situated in space 226.

Frame 242, the frame members 250 that are situated beneath portions 264 of frame 242, the portions 266 of U-shaped frame members 248 that are situated beneath portions 264 of frame 242, and the portions 266 of frame members 244, 246, 247 that are situated beneath portions 262 of frame 242 are considered to be a second set of barriers that extend upwardly from the floor structure of carrier 220. Spaces 230, 232, 234, 236 are defined above the floor structure and between the first and second set of barriers. The second set of barriers surround spaces 230, 232, 234, 236 and are spaced from the first set of barriers.

The second set of barriers tends to prevent objects carried in spaces 230, 232, 234, 236 from failing out of carrier 220. Frames 240, 242 and frame members 244, 246, 247, 248, 250 provide numerous attachment points for ropes, straps, flexible cords, and the like which may be used to further retain or secure cargo in or on carrier 220.

In the illustrative embodiment, frames 240, 242 and frame members 244, 246, 247, 248, 250, 254, 256 are made from 1 inch by 1 inch aluminum tubes having square-shaped cross sections. In addition, one of frame members 252 and frame member 257 are made from 1 inch by 1¼ inch aluminum tubes having rectangular-shaped cross sections. Furthermore, the other of frame members 252 is made from a 1 inch by 1½ inch aluminum tube. Thus, all of the frame members of illustrative carrier 220 have quadrilateral-shaped cross sections. In the illustrative embodiment of carrier 220, height 270 of frame members 244, 246, 247, 248 is ten inches; length 272 of frame member 248 is fifty inches; length 274 of frame member 44 is fifty four inches; length 276 of frame member 246 is ten inches; and length 277 of frame member 247 is fourteen inches.

Referring to FIG. 11, the illustrative carrier 220 has an overall length 296 of one hundred three inches and an overall width 298 of fifty four inches. Other dimensions shown in FIG. 11 are as follows: dimension 300 is six inches; dimension 310 is three inches; dimension 312 is eight inches; dimension 314 is eleven inches; dimension 316 is fourteen inches; dimension 318 is eleven inches; dimension 320 is seven inches; dimension 322 is thirty inches; dimension 324 is sixty seven inches; dimension 326 is nine inches; dimension 328 is thirty two inches; and dimension 330 is thirteen inches. Dimension 300 of six inches is typical of the spacing between each adjacent pair of frame members 244, 246, 247, 248 along the longitudinal dimension of carrier 220. Thus, frame members 244, 246, 247, 248 are equidistantly spaced between the ends of carrier 220.

Referring to FIG. 12, dimensions 296, 298, 310, 312, 314 of illustrative carrier 220 are shown again. Other dimensions shown in FIG. 12 are as follows: dimension 332 is six inches; dimension 334 is ninety one inches; dimension 336 is three and one half inches; dimension 337 is one hundred one inches; dimension 338 is thirty one inches; dimension 340 is sixty five inches; dimension 342 is seven inches; dimension 344 is three and one half inches; dimension 346 is three and one half inches; dimension 348 is thirteen inches; dimension 350 is eleven inches; and dimension 352 is eight inches. Referring to FIG. 13, additional dimensions of illustrative carrier 220 are as follows: dimension 286 is one inch; dimension 290 is one and one fourth inches; dimension 291 is one and one half inches; dimension 354 is nine inches; dimension 356 is thirty two inches; dimension 358 is thirteen inches; dimension 360 is twelve inches; dimension 362 is thirteen and one half inches; dimension 364 is thirteen and one half inches; dimension 366 is fifteen inches; dimension 368 is eleven inches; dimension 370 is nine inches; dimension 372 is eight inches; dimension 374 is eleven inches; dimension 376 is thirteen inches; dimension 378 is eleven inches; dimension 380 is eight inches; and dimension 382 is three inches. Referring to FIG. 14, in addition to dimensions 368, 370, the following dimensions of illustrative carrier 220 are shown: dimension 384 is nineteen inches; dimension 386 is thirteen inches; dimension 388 is eleven inches; and dimension 390 is eleven inches.

Although upper surfaces of frames 40, 42 of carrier 20 are coplanar and although upper surfaces of frames 240, 242 of carrier 220 are coplanar, it is within the scope of this disclosure for carriers to have upper frame members with upper surfaces that are not coplanar. For example, the upper surfaces of the second set of barriers may be higher in elevation than the upper surfaces of the first set of barriers or vice versa. In addition, although carriers 20, 220 are both rectangular in overall shape, it is contemplated by this disclosure that carriers may have overall shapes other than rectangular, such as, for example, oval, elliptical, square, circular, pentagonal, and so on. Furthermore, in lieu of the various tubular frame members of carriers 20, 220, carriers made of either a unitary shell or multi-piece shell having solid, or mostly solid, barriers and floor structures are contemplated by this disclosure, as are carriers made from a combination of one or more shell pieces and one or more frame members. In such embodiments, the shells may have holes, slots, and the like and/or separate loops or eyelets appended thereto for attachment of straps, ropes, flexible cords, and the like. Moreover, each of carriers 20, 220 and the alternative carriers contemplated herein, may also comprise a single-piece or multi-piece top that covers some or all of spaces 26, 30, 32, 34, 36 or spaces 226, 230, 232, 234, 236, as the case may be. Such tops may be either removable from the associated carrier or coupled to the associated carrier, such as by hinges, for movement between opened and closed positions.

Although the invention has been described in detail with reference to certain illustrative embodiments, variations and modifications exist within the scope and spirit of the invention as described and as defined in the following claims.

The invention claimed is:

1. An apparatus for carrying cargo on a roof of a recreational vehicle which has a rooftop air conditioning unit, the apparatus comprising a cargo carrier having a first set of barriers and a second set of barriers, cargo-receiving spaces being defined between the first and second set of barriers and in front of, in back of, and alongside the rooftop air conditioning unit, wherein the first set of barriers define a unit-receiving space that is adapted to receive the rooftop air conditioning unit therein.

2. The apparatus of claim 1, wherein the cargo carrier comprises a plurality of frame members that are coupled together to form a rack having a plurality of open spaces between the plurality of frame members.

3. The apparatus of claim 2, wherein each of the plurality of frame members comprises a tubular element having a quadrilateral-shaped cross section.

4. The apparatus of claim 1, wherein the cargo-receiving spaces are adjacent to the first set of barriers.

5. The apparatus of claim 4, wherein the second set of barriers completely surround the first set of barriers.

6. The apparatus of claim 5, wherein the first set of barriers has a first top surface and the second set of barriers has a second top surface that is substantially coplanar with the first top surface.

7. The apparatus of claim 4, wherein the first set of barriers has a top surface that defines a plane which extends above a top of the rooftop air conditioning unit.

8. An apparatus for carrying cargo on a roof of a recreational vehicle which has a rooftop air conditioning unit, the apparatus comprising a cargo carrier having cargo-receiving spaces in front of, in back of, and alongside the rooftop air conditioning unit, wherein the cargo carrier comprises a plurality of frame members that are coupled together to form a rack having a plurality of open spaces between the plurality of frame members, wherein the plurality of frame members comprise a first rectangular frame, a second rectangular frame, and a plurality of U-shaped frame members, some of the U-shaped frame members interconnect the first rectangular frame with the second rectangular frame, and others of the U-shaped frame members interconnect a first portion of the first rectangular frame with a second portion of the first rectangular frame.

9. The apparatus of claim 8, wherein the first rectangular frame has a first top surface and the second rectangular frame has a second top surface that is substantially coplanar with the first top surface.

10. The apparatus of claim 8, wherein the second rectangular frame is surrounded by the first rectangular frame.

11. An apparatus for carrying cargo on a roof of a recreational vehicle which has a rooftop air conditioning unit, the apparatus comprising a cargo carrier having a unit-receiving space in a central region thereof, the unit-receiving space being sized and configured to receive the rooftop air conditioning unit therein so that the cargo carrier surrounds the rooftop air conditioning unit along sides and ends thereof, wherein the cargo carrier comprises a first rectangular frame that surrounds an upper portion of the unit-receiving space, a second rectangular frame that surrounds the first rectangular frame and that is spaced from the first rectangular frame, and a plurality of U-shaped frame members, some of the U-shaped frame members interconnect the first rectangular frame with the second rectangular frame, and others of the U-shaped frame members interconnect a first portion of the second rectangular frame with a second portion of the second rectangular frame.

12. The apparatus of claim 11, wherein the first rectangular frame has a first top surface and the second rectangular frame has a second top surface that is substantially coplanar with the first top surface.

13. An apparatus for carrying cargo on a roof of a recreational vehicle which has a rooftop air conditioning unit, the apparatus comprising a cargo earner having a unit-receiving space in a central region thereof, the unit-receiving space being sized and configured to receive the rooftop air conditioning unit therein so that the cargo carrier surrounds the rooftop air conditioning unit along sides and ends thereof, wherein the cargo carrier has a first set of barriers surrounding the unit-receiving space and a second set of barriers surrounding the first set of barriers, the second set of barriers being spaced from the first set of barriers to define cargo-receiving spaces between the first and second set of barriers.

14. The apparatus of claim 13, wherein the first set of barriers has a first top surface and the second set of barriers has a second top surface that is substantially coplanar with the first top surface.

15. The apparatus of claim 13, wherein each of the first and second set of barriers comprises spaced-apart, vertically extending frame members.

16. The apparatus of claim 13, wherein the unit receiving space in the central region of the cargo carrier is offset toward at least one of the sides or one of the ends of the cargo carrier.

17. An apparatus for carrying cargo on a roof of a recreational vehicle which has a rooftop air conditioning unit, the apparatus comprising
 a floor structure attachable to the roof of the recreational vehicle,
 a first set of barriers extending upwardly from the floor structure, the first set of barriers being arranged to define a unit-receiving well in which the rooftop air conditioning unit is receivable, and
 a second set of barriers extending upwardly from the floor structure, the second set of barriers being spaced from the first set of barriers, a cargo-carrying space being defined above the floor structure and between the first and second barriers.

18. The apparatus of claim of claim 17, the first set of barriers has a first top surface and the second set of barriers has a second top surface that is coplanar with the first top surface.

19. The apparatus of claim 17, wherein the floor structure, the first set of barriers, and the second set of barriers each comprise a plurality of tubular frame members.

20. The apparatus of claim 17, wherein the floor structure has a first set of frame members and a second set of frame members underneath the first set of frame members, one of the second set of frame member has a first bottom surface that is spaced further below the first set of frame members than a second bottom surface of another of the second set of frame members is spaced below the first set of frame members so that the floor structure generally matches a contour of the roof of the recreational vehicle.

* * * * *